United States Patent
Peng et al.

(10) Patent No.: US 7,323,076 B2
(45) Date of Patent: Jan. 29, 2008

(54) METHOD OF MAKING A PLANK ASSEMBLY HAVING A PROTECTIVE FILM

(75) Inventors: Weiling Peng, Alta Loma, CA (US); Jeffrey Bergh, Long Beach, CA (US)

(73) Assignee: James Hardie International Finance B. V., Amsterdam (NL)

( * ) Notice: Subject to any disclaimer, the term of this patent is extended or adjusted under 35 U.S.C. 154(b) by 257 days.

(21) Appl. No.: 10/791,970

(22) Filed: Mar. 2, 2004

(65) Prior Publication Data

US 2004/0163757 A1    Aug. 26, 2004

Related U.S. Application Data

(62) Division of application No. 10/029,558, filed on Oct. 24, 2001, now Pat. No. 6,699,576.

(60) Provisional application No. 60/243,760, filed on Oct. 26, 2000, provisional application No. 60/243,761, filed on Oct. 26, 2000.

(51) Int. Cl.
  *C09J 4/00*   (2006.01)
  *B32B 37/02*  (2006.01)

(52) U.S. Cl. ..................... 156/202; 156/212

(58) Field of Classification Search ............ None
See application file for complete search history.

(56) References Cited

U.S. PATENT DOCUMENTS

| | | |
|---|---|---|
| 2,956,310 A | 10/1960 | Roop et al. |
| 3,111,450 A * | 11/1963 | Stevens ............ 428/421 |
| 3,133,854 A | 5/1964 | Simms |
| 3,228,823 A | 1/1966 | Usala et al. |
| 3,313,675 A * | 4/1967 | Christos et al. ............ 428/414 |
| 3,419,461 A | 12/1968 | Gebhard, Jr. et al. |
| 3,475,261 A | 10/1969 | Ettore et al. |
| 3,492,194 A | 1/1970 | Rauch |
| 3,729,368 A | 4/1973 | Ingham et al. |
| 3,738,900 A | 6/1973 | Matzke |
| 4,117,185 A | 9/1978 | Cummins et al. |
| 4,184,906 A | 1/1980 | Young |

(Continued)

FOREIGN PATENT DOCUMENTS

AU          515151          3/1981

OTHER PUBLICATIONS

Dupont Tedlar, "Adhesive and Lamination Guide for *Tedlar* PVF Film," Internet, On-line, Oct. 1995.

(Continued)

*Primary Examiner*—Richard Crispino
*Assistant Examiner*—Barbara J. Musser
(74) *Attorney, Agent, or Firm*—Gardere Wynne Sewell LLP

(57) ABSTRACT

A building material having a durable exterior finish comprising a fiber cement substrate laminated with a fluorohydrocarbon protective film. The protective film provides the fiber cement substrate with resistance to weathering and maintains the surface texture of the underlying fiber cement substrate while providing an aesthetically pleasing and uniform pre-finish on the exterior surface. The protective film is bonded to the fiber cement substrate using an adhesive composition comprised of a one-component moisture cure polyurethane or polyurea adhesive composition having a reactive isocyanate compound or a two component polyurethane or polyurea composition.

12 Claims, 4 Drawing Sheets

U.S. PATENT DOCUMENTS

| | | |
|---|---|---|
| 4,361,616 A | 11/1982 | Bömers |
| 4,463,043 A | 7/1984 | Reeves et al. |
| 4,511,626 A | 4/1985 | Schumacher |
| 4,728,710 A | 3/1988 | Goel |
| 4,894,102 A * | 1/1990 | Halls et al. .................. 156/94 |
| 5,098,498 A * | 3/1992 | Hale et al. .................. 156/213 |
| 5,603,798 A | 2/1997 | Bhat |
| 5,656,121 A | 8/1997 | Fukushi |
| 5,658,670 A | 8/1997 | Fukushi et al. |
| 5,718,759 A | 2/1998 | Stav et al. |
| 5,728,246 A * | 3/1998 | Ewaschuk .................. 156/211 |
| 5,759,654 A | 6/1998 | Cahill |
| 5,759,695 A | 6/1998 | Primeaux |
| 5,795,654 A | 8/1998 | Koishi et al. |
| 5,855,977 A | 1/1999 | Fukushi et al. |
| 5,861,211 A | 1/1999 | Thakkar et al. |
| 5,863,657 A | 1/1999 | Kawashima et al. |
| 5,908,704 A | 6/1999 | Friedman et al. |
| 6,020,429 A * | 2/2000 | Yang et al. ............... 525/92 C |
| 2002/0169271 A1 | 11/2002 | Peng |

OTHER PUBLICATIONS

DuPont® Tedlar® polyvinyl fluoride film, Product Information, 10 pp., Oct. 1995, USA.

* cited by examiner

METHOD OF MAKING A PLANK ASSEMBLY HAVING A PROTECTIVE FILM

RELATED APPLICATIONS

This application is a divisional of U.S. patent application having Ser. No. 10/029,558 now U.S. Pat. No. 6,699,576 and filed on Oct. 24, 2001. This application also claims the benefit of U.S. Provisional Application No. 60/243,760, filed on Oct. 26, 2000, and U.S. Provisional Application No. 60/243,761, filed on Oct. 26, 2000, which are hereby incorporated by reference in their entirety.

BACKGROUND OF THE INVENTION

1. Field of the Invention

This invention relates to building materials, and more particularly, to a building material substrate having an improved exterior finish and method for making the same.

2. Description of the Related Art

Fiber cement in recent years has become popular for use as a building material. In many instances, fiber cement is preferred over the more conventional materials such as wood, metal, or plastics. When compared with wood, fiber cement has better water resistance and is also less prone to rotting, cracking or splitting. Moreover, fiber cement does not rust like metal and is more durable to weathering than plastics. In particular, fiber cement products such as James Hardie Building Products' HARDIPLANK® offer a lifetime of low maintenance and can be installed just as easily as wood sidings.

Advantageously, fiber cement can withstand extended exposure to humidity, rain, snow, salt air, and termites. It is also dimensionally stable and will not crack, rot, or delaminate under normal environmental conditions. Moreover, fiber cement panels may be pretextured or embossed to give the panel a desired look and feel. The panels may, for instance, be textured to resemble the look and warmth of natural wood. As such, fiber cement siding is a durable, attractive alternative to traditional wood composite, cedar, vinyl, brick or stucco sidings. Additionally, fiber cement is also an inexpensive alternative to conventional roofing materials such as corrugated aluminum sheets, which can be costly and energy intensive.

In some cases, the exterior surface of fiber cement panels is painted or subject to other types of post-production or on-site finishing to give the material the desired exterior appearance and feel for a particular application. Disadvantageously, however, natural weathering and other environmental factors can lead to chalking of the exposed paint surface and loss of polymer in the paint film. Moreover, the paint layers are typically very thin, generally on the order of one to two mils, and therefore are particularly susceptible to chipping, peeling, and scratching from surface abuse. Furthermore, the exterior surface of some building materials such as fiber cement can absorb up to about 30% water by weight, which may cause the panel to experience freeze-thaw during the winter and become damaged.

To improve the durability of the exterior surface of building materials, manufacturers sometimes bond protective films to the exposed surface so that it can better withstand exposure to the elements. The films can also be used to increase the aesthetics of the building material. One commonly used protective film is a polyvinyl fluoride (PVF) film manufactured by DuPont under the trademark TEDLAR®, which has proven to be very durable for exterior applications. However, it is particularly difficult to bond TEDLAR® or other fluorohydrocarbon films to fiber cement substrates. The adhesives used to bond TEDLAR® films to building material substrates are generally undesirable, particularly for bonding the film to the fiber cement substrate.

Conventional adhesives typically do not provide durable adhesion between TEDLAR® and fiber cement because fluorohydrocarbon films such as TEDLAR® are generally not easy to wet and to form bonds with another surface. Moreover, fiber cement has weak surface layers that can be easily peeled off if the selected adhesive cannot strongly adhere to the fiber cement. Furthermore, these adhesives generally take an undesirably long time to set, thereby causing a reduction in production throughput. Additionally, the adhesives also contain volatile organic chemicals (VOCs) that have shown to cause adverse effects on the environment. As such, the exterior finish of fiber cement substrates are often left unprotected from the elements and can become damaged by environmental conditions.

Hence, from the foregoing, it will be appreciated that there is a need for a building material assembly having a durable exterior finish that is resistant to weathering. To this end, there is a particular need for a fiber cement assembly having a protective film bonded to the exterior surface of the fiber cement substrate so as to provide the assembly with a durable finish while maintaining a desired textured appearance. Furthermore, it will be appreciated that there is a need for an adhesive system that is adapted to form a durable bond between a fluorohydrocarbon film and a substrate surface, such as fiber cement.

SUMMARY OF THE INVENTION

The aforementioned needs are satisfied by the building material assembly of the preferred embodiments of the present invention. In one aspect, the building material assembly comprises a building material substrate, a fluorohydrocarbon film, and a layer of rapid-setting non-VOC adhesive positioned between the substrate and the film so as to form a durable bond therebetween. Preferably, the adhesive system comprises a one component polyurethane or polyurea adhesive composition including a reactive isocyanate compound and one or more catalysts. Preferably, the isocyanate compound wets the fluorohydrocarbon film and forms a physical bond with the film. Preferably, the catalyst catalyzes a reaction that forms a chemical bond between the isocyanate compound in the adhesive mixture and the hydroxyl functional groups in the substrate. In one embodiment, the adhesive system further comprises a plasticizer that modifies the rheological characteristics of the adhesive. In yet another embodiment, the adhesive system includes a defoamer surfactant that reduces the occurrence of blisters in the adhesive. Furthermore, the adhesive composition may also comprise additives such as antioxidant, moisture scavenger, UV absorber, and/or heat stabilizer to improve the durability of the adhesive.

In another embodiment, the adhesive system comprises a two component polyurethane adhesive composition including a reactive isocyanate compound, a polyol containing hydroxyl functional groups, one or more catalysts, and optionally a plasticizer, a defoamer surfactant, a moisture scavenger, an antioxidant, a UV absorber, and heat stabilizer. Preferably, the catalyst is adapted to catalyze a reaction between isocyanate and hydroxyl functional groups so as to form a polyurethane based polymer that will physically interlock and bond with the fluorohydrocarbon film and the substrate. In one embodiment, the polyol may be substituted by a polyamine so as to form a two component polyurea adhesive system.

Advantageously, the adhesive systems of the preferred embodiments of the present invention provide excellent adhesion for laminating a fluorohydrocarbon film to fiber cement as well as other substrates such as wood, metals, and plastics. Furthermore, the preferred adhesive systems do not contain any measurable amounts of volatile organic chemicals (VOCs) and therefore do not pose threats to the environment or worker's health. The preferred adhesive systems also provide a fast working time and set time so as to increase the manufacturing throughput.

Furthermore, the building material substrate may comprise a fiber reinforced material, a metal material, a plastics material, or a wood material. The fluorohydrocarbon film preferably comprises a polyvinyl fluoride film such as TEDLAR® manufactured by DuPont. In one embodiment, the film is laminated to the substrate in a manner such that the texture and embossing on the substrate are transferred to the film. In another embodiment, the film is bonded to the exterior surface (provided as an exterior-facing surface with respect to a building and also referred to as a first surface) and side edges (also referred to as a second surface) of the substrate so as to provide the substrate with a uniform exterior appearance.

In another aspect, the preferred embodiments of the present invention provide a method of manufacturing a building material assembly having a protective fluorohydrocarbon film bonded to the exterior surface of the substrate by a rapid-setting non-VOC polyurethane based adhesive. In one embodiment, the method comprises using a membrane vacuum press to laminate the film to the exterior surface and side edges of the substrate at the same time. In another embodiment, the method comprises using a continuous isobaric press to simultaneously laminate the film to the exterior surface and side edges of the substrate. Preferably, the continuous isobaric press includes a plurality of vertical rubber belts that are designed to fit in the gap between adjacent substrates and exert lateral pressure against the side edges of the substrates so as to press the film against the side edges while the pressure is also applied against the exterior surface of the substrate.

Advantageously, the building material assembly of preferred embodiments of the present invention and method of producing the same provide a building material having a durable exterior surface that can withstand weathering. Furthermore, the building material also retains its original aesthetic qualities as the texture and embossing on the substrate are fully transferred to the film. Furthermore, the side edges of the substrate are protected as well so as to inhibit UV damage that might otherwise damage the substrate. Furthermore, the method of producing the board significantly reduce the cycle time required as the exterior surface and side edges are laminated at the same time. These and other objects and advantageous of the present invention will become apparent from the following description taken in conjunction with the accompanying drawings.

DETAILED DESCRIPTION OF THE PREFERRED EMBODIMENTS

Reference will now be made to the drawings wherein like numerals refer to like parts throughout. As described hereinbelow, the building material assembly of the preferred embodiments provide a fiber cement substrate with a durable exterior surface that has superior weather resistance and UV resistance while maintaining a desired surface finish.

Figure 1:
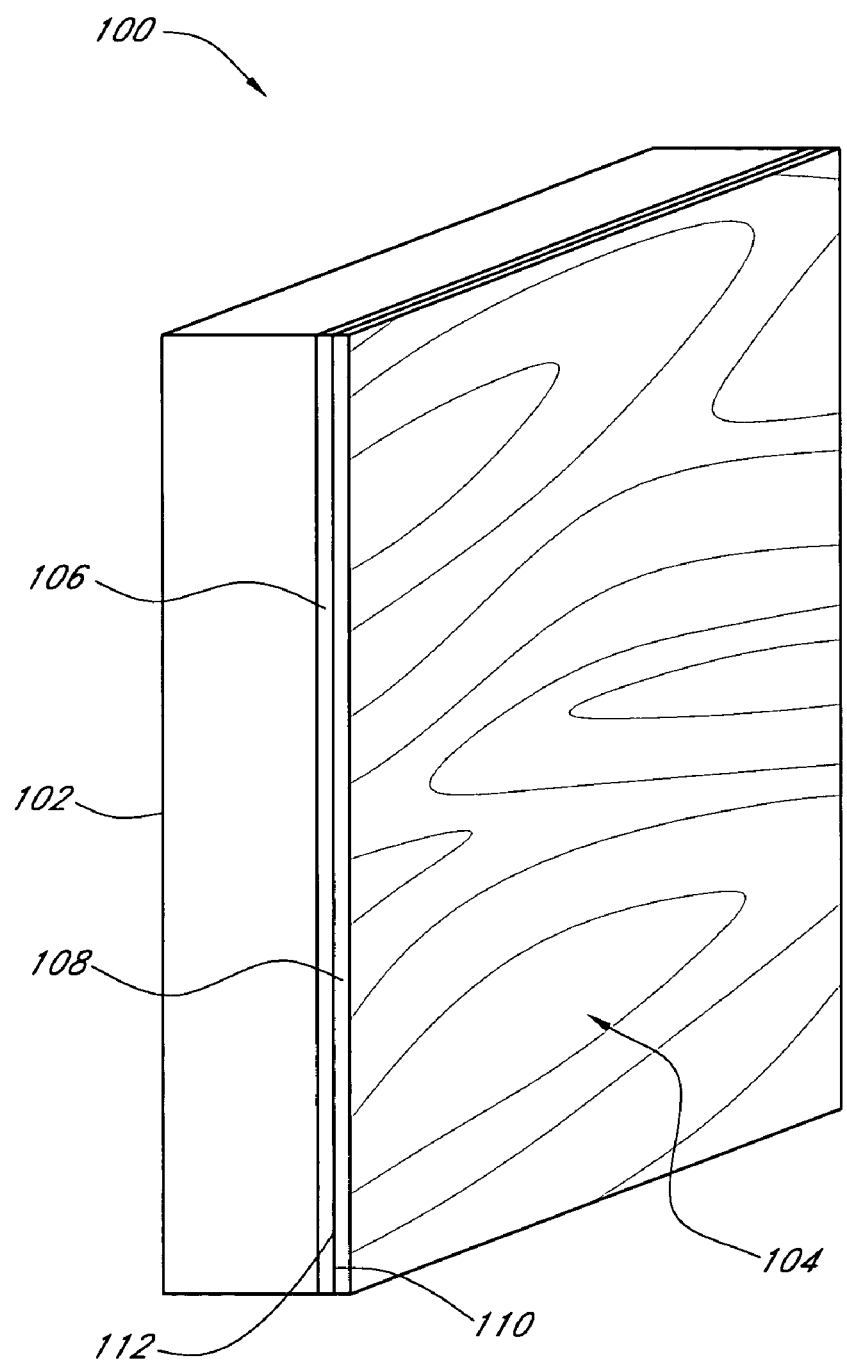
FIG. 1 is a perspective view of a building material assembly of one preferred embodiment.

FIG. 1 shows a building material assembly 100 of one preferred embodiment. As FIG. 1 illustrates, the building material assembly 100 comprises a substrate 102 having an exterior surface 104 (provided as an exterior-facing surface with respect to a building and also referred to as a first surface) that is embossed or textured. Preferably, the substrate 102 comprises a substantially rectangular fiber cement plank that is approximately 1/64 inch to 2 inches thick, more preferably about 3/16 inch to 1 inch thick when the plank is to be used as part of a siding or building panel. In one embodiment, the fiber cement planks used are those described in Australian Patent No. AU 515151, entitled "Fiber Reinforced Cementitious Articles" owned by James Hardie International Finance B.V. However, other substrates may also be used, including but not limited to wood, metals such as aluminum, concrete or other cementitious materials, plastics such as polyvinyl chloride, composite materials such as fiber reinforced plastics, engineered wood materials such as hardboard or oriented strand board and gypsum board. In preferred embodiments, the exterior surface of the substrate is comprised of materials having hydroxyl functional groups that are positioned to bond with other chemical compounds. Substrate materials that have naturally occurring hydroxyl functional groups include substrates made of various wood and fiber cement materials.

As FIG. 1 shows, the building material assembly 100 further comprises a layer of adhesive 106 that is applied to the exterior surface 104 of the substrate 102. Preferably, the adhesive 106 may comprise a one-component moisture-cure polyurethane or polyurea adhesive or a two component polyurethane or polyurea adhesive. Preferably, the adhesive layer 106 has a uniform thickness of approximately 0.001 to 0.005 inch. Furthermore, as FIG. 1 illustrates, the building material assembly 100 further comprises a layer of protective film 108 having a bonding surface 110 that is positioned adjacent an upper surface 112 of the adhesive layer 106. The protective film 108 is preferably between about 0.0015 to 0.008 inch thick and is preferably a fluorohydrocarbon film. In one embodiment, the protective film 108 is a polyvinyl fluoride (PVF) film manufactured by DuPont under the trademark TEDLAR®. TEDLAR® film is commonly available in rolls and can have a layer of adhesion enhancing coating as in TEDLAR® 68070 or 68080. The adhesion enhancing coating is generally between about 0.0002 to 0.002 inch thick and is applied to the bonding surface of the TEDLAR® film. Advantageously, the fluorohydrocarbon film 108 provides the substrate 102 with a strong and durable exterior that is resistant to weathering and paint deterioration.

One Component Moisture Cure Polyurethane or Polyurea Adhesive

In one preferred embodiment, the adhesive system used to bond the protective film 108 to the substrate 102 generally comprises a moisture-cure polyurethane or polyurea adhesive composition having a reactive isocyanate compound and a catalyst. The isocyanate compound may be any aromatic, aliphatic, cycloaliphatic, acrylaliphatic, or heterocyclic isocyanate or polyisocyanate, and the prepolymers or mixtures thereof. In one embodiment, the isocyanate compound comprises an isocyanate group terminated prepolymer synthesized from an aromatic or aliphatic isocyanate. Preferably, the prepolymer is synthesized from isocyanate monomer or polyisocyanate with organic compound which has at least two active hydrogen containing functional groups. In one embodiment, the active hydrogen containing functional groups may be selected from the group consisting of —COOH, —OH, —NH$_2$, —NH—, —CONH$_2$, —SH, and —CONH—.

Preferably, the isocyanate is of aromatic or aliphatic type and has a pH level between about 6.5 and 7.5, more preferably between about 6.8 and 7.2. Preferably, the isocyanate compound present in the adhesive composition has an —NCO functional group that is approximately between 10% and 33% by weight of the total weight of the polymer, more preferably between about 30% and 33% by weight. Furthermore, the isocyanate polymer has functionality preferably between about 2.0 and 3.5, with an average functionality of at least 2.0, and has a viscosity between about 200 centipoise (CPS) and 200,000 CPS, more preferably between about 200 CPS and 3,000 CPS to attain optimum wetting of a bonding surface such as a fluorohydrocarbon film.

Preferably, the isocyanate compound mechanically interlocks with the pores and contours on the fluorohydrocarbon film and forms a plurality of physical bonds with the film. Suitable isocyanate group terminated prepolymers include Desmodur E-28 available from Bayer of Pittsburgh, Pa.; UR-0222 MF available from H. B. Fuller of St. Paul, Minn. Suitable liquid isocyanate terminated adhesives include Rubinate M available from Huntsman Polyurethanes, MI of Sterling Heights, Mich.; Mondur MR, Mondur MRS, Mondur MRS-4, and Mondur MR200, available from Bayer; Papi 94, Papi 27, Papi 20 available from Dow Chemical of Midland, Mich. Suitable aliphatic isocyanates include Desmodur XP-7100 (Bayer), Desmodur N-3400 (Bayer) and Desmodur N-3300 (Bayer).

Preferably, the adhesive composition also comprises one or more catalysts known in the art such as tetra amines, metal salts, and any combinations thereof. The metal salts may include tin carboxylate, organosilicon titanates, alkyl titanates, bismuth carboxylates, zinc carboxylates, zinc-based salt, tin-based salt catalyst and the like. Preferably, the adhesive system comprises approximately 0.005% to 5% of catalyst by weight. Preferably, the catalyst is capable of catalyzing a reaction between the isocyanate and hydroxyl functional groups in the fiber cement substrate in the presence of moisture so as to form a chemical bond between the isocyanate compound in the adhesive mixture and the hydroxyl functional groups in the substrate. Instead of providing a second adhesive component that contains hydroxyl functional groups to react with the isocyanate, the preferred one-component adhesive system uses the hydroxyl functional groups that are already present on the exterior surface of the substrate. Preferably, the hydroxyl functional groups on the substrate react with the isocyanate compound to form chemical bonds. This obviates the need of providing an additional second adhesive component as a source for hydroxyl functional groups. In one embodiment, the catalyst present in the adhesive system is a bismuth-based salt having a bismuth concentration between approximately 0.3% to 20% by weight.

In another embodiment, the adhesive system further comprises a plasticizer that allows for modification of the rheological characteristics of the adhesive. Preferably, a plasticizer such as alkyl phthalates (dioctylphthalate or dibutylphthalate), trictyl phosphate, epoxy plasticizers, toluene-sulfamide, chloroparaffins, adipics acid esters, castor oil, toluene and alkyl naphthalenes may be used for a polyurethane adhesive system. The amount of plasticizer is preferably between about 0% and 50% by weight. In yet another embodiment of the present invention, the adhesive system further includes a defoamer surfactant that allows for the modification of blister characters in the adhesive. Preferably, the defoamer can be between about 0% and 5% by weight. In yet another embodiment, the adhesive system further comprises additives such as antioxidant, UV absorber, moisture scavengers, and heater stabilizer wherein the additives preferably comprise approximately 0% to 5% by weight of the adhesive system. Advantageously, the one component adhesive of the preferred embodiments forms a durable bond between the fluorohydrocarbon film and the substrate and has a quick set time of 20 to 300 seconds at 350° F.

The one component moisture-cure polyurethane or polyurea adhesive composition can be used to bond a fluorohydrocarbon film to a fiber cement substrate. Generally, the adhesive is applied to either a surface of the film or a surface of the fiber cement substrate. The film is then placed on the fiber cement in a manner such that the adhesive layer is interposed therebetween. The film is subsequently bonded to the fiber cement using a known lamination process. In one embodiment, a padding material such as a sheet of rubber may be placed adjacent the nonadhesive side of the film during the lamination process. The following examples are illustrative embodiments of the one component moisture-cure polyurethane or polyurea adhesive composition used in the context of laminating a fluorohydrocarbon film to a substrate. However, it can be appreciated that these examples are for illustrative purposes only and are not intended to limit the scope of the invention.

EXAMPLE 1

A preferred composition of the one-component moisture cure polyurethane adhesive comprises 100 g of an aromatic polymeric isocyanate such as Rubinate M available from Huntsman Polyurethanes, Mich., mixed with 0.2 g of a tin-based catalyst such as Metacure T12 catalyst available from Air Products and Chemicals, Inc., PA. Applicant has used this adhesive composition to bond a TEDLAR® film to a textured fiber cement substrate.

In particular, approximately 0.5 g of this adhesive mixture was applied, by brush, onto a top surface of the fiber cement substrate. The substrate was approximately 2 inch×6 inch and had a 5/16 inch thickness and a moisture content of about 6% by weight. A TEDLAR® film having a thickness of 0.0015 inches was subsequently placed on the top surface of the fiber cement substrate where the adhesive was applied. The stack comprised of the TEDLAR® film, adhesive, and fiber cement substrate was subsequently pressed at 225° F., 600 psi for 3 minutes to laminate the film to the substrate. Additionally, a padding material comprised of a sheet of rubber having a 1/16 inch thickness and 30 durometer shore A hardness was placed on the top surface of the nonadhesive side of the TEDLAR® film during the lamination process.

EXAMPLE 2

Another preferred composition of the one-component moisture cure polyurethane adhesive comprises 100 g of an aliphatic isocyanate such as Desmodur XP7100 available from Bayer of Pittsburgh, Pa., mixed with 0.4 g of a tin-based catalyst such as Metacure T12 available from Air Products and Chemicals, Inc., PA. Applicant also has used this particular composition to bond a TEDLAR® film to a fiber cement substrate.

In particular, approximately 0.5 g of this adhesive mixture was applied, by brush, on a first surface of a 2 inch×6 inch TEDLAR® film having a thickness of 0.0015 inches. The TEDLAR® film was then placed on a top surface of a ¼ inch thick flat fiber cement substrate with the first surface of the TEDLAR® film coming into contact with the top surface of the substrate. The stack comprised of the TEDLAR® film, adhesive, and fiber cement substrate was subsequently pressed at 350° F., 600 psi for 5 minutes to laminate the film to the substrate. Additionally, a padding material such as a sheet of rubber having a 1/16 inch thickness and 30 durometer hardness was placed on the top surface of the nonadhesive side of the TEDLAR® film during the lamination process.

Two Component Polyurethane or Polyurea Adhesive

In another preferred embodiment, the adhesive system generally comprises a two component polyurethane adhesive composition including a reactive isocyanate compound, a polyol, a catalyst, and optionally a plasticizer, a defoamer surfactant, a moisture scavenger, an antioxidant, a UV absorber, and heat stabilizer. Preferably, the catalyst is capable of catalyzing a reaction between the isocyanate compound and the hydroxyl functional groups contained in the polyol to form a polyurethane based polymer. In one embodiment, the polyurethane based polymer interlocks with the pores and contours on the film and substrate so as to form a plurality of physical bonds with the film and substrate. In another embodiment, the isocyanate compound reacts with the hydroxyl functional groups in the fiber cement substrate to form a plurality of chemical bonds with the substrate.

Preferably, the isocyanate compound comprises approximately 25% to 75% of the adhesive composition by weight, more preferably 40% to 60%. Preferably, the isocyanate compound is of aromatic or aliphatic type, and has between about 10% to 33% NCO functional group by weight, more preferably between about 30% and 33%. Preferably, the isocyanate has a pH level between about 6.5 and 7.5, more preferably between about 6.8 and 7.2. Preferably, the isocyanate compound present in the adhesive system has functionality between about 2.0 and 3.5 and has a viscosity between about 200 centipoise (CPS) and 200,000 CPS, more preferably between about 200 CPS and 3,000 CPS.

Suitable isocyanate compounds that can be used in the two component adhesive composition include liquid isocyanates such as Rubinate M available from Huntsman of Sterling Heights, Mich.; Mondur MR, Mondur MRS, Mondur MRS-4, and Mondur MR200 available from Bayer of Pittsburgh, Pa.; Papi 94, Papi 27, and Papi 29 available from Dow Chemical of Midland, Mich.; and isocyanate group terminated prepolymers, such as Desmodur E-28 available from Bayer, UR-0222 Mf available from H. B. Fuller; and aliphatic isocyanates such as Desmodur XP-7100, Desmodur N-3400, and Desmodur N-3300 from Bayer.

The two component adhesive also comprises a polyol that comprises between about 25% and 75% by weight, more preferably between about 40% and 60% by weight of the adhesive composition. Preferably, the polyol present in the adhesive composition has a molecular weight between about 200 and 5,000 and a functionality between about 2.0 and 4.0, more preferably about 3.0. Preferably, the polyol has a viscosity between about 100 CPS and 30,000 CPS, more preferably between about 100 CPS and 500 CPS. Preferably, the polyol has a pH level between about 6.5 and 7.5, more preferably about 7.0. Suitable polyol compounds include Jeffol available from Huntsman of Sterling Heights, Mich.; Desmophen available from Bayer; Varanol available from Dow Chemical Co.

In an alternative embodiment, polyol may be substituted by a polyamine having substantially the specifications as the above described polyol with the exception of pH level, thus forming a two component polyurea adhesive system. The polyamine compound may include Jeffamine available from Huntsman. The catalysts used for the two component polyurethane or polyurea adhesive system are preferably the same as those used for the one component moisture cure polyurethane adhesives. Likewise, the plasticizer, defoamer surfactant, antioxidant, UV absorber, and heat stabilizer in the two component adhesive systems are substantially the same as those used in the one-component adhesive system. Furthermore, in preferred embodiments, the two component adhesive systems have a set time of about 1 to 120 minutes at room temperature and about 5 to 120 seconds at 350° F., more preferably about 5 to 30 seconds at 350° F.

A preferred method for preparing the two component adhesive system comprises a first step wherein polyol or polyamine is mixed with the catalyst, and optionally with the plasticizer, defoamer, moisture scavenger, antioxidant, UV absorber, heat stabilizer to form a mixture. A second step involves mixing isocyanate with the mixture prepared in the first step for an amount of time that is sufficient to form an adhesive mixture for use but less than the pot life of the adhesive mixture. The pot life of the adhesive can be measured by using an industry standard procedure which involves measuring the viscosity of the adhesive mixture using a viscometer such as that provided by Brookfield.

EXAMPLE 3

A preferred composition of the two component polyurethane adhesive system includes a first component and a second component. The first component comprises 100 g of an aromatic polymeric isocyanate such as Rubinate M available from Huntsman Polyurethanes, Mich. The second component comprises 100 g of a polyol such as Voranol 230-238 available from Dow Chemical Company mixed with 0.2 g of a bismuth and zinc based catalyst such as Bicat 8 from Shepherd Chemical Company, OH. The first and second components were then mixed to form an adhesive mixture. Applicant has used this adhesive mixture to bond a TEDLAR® film to a textured fiber cement substrate.

In particular, approximately 0.4 g of this mixture was applied, by brush, onto a top surface of a 2 inch×6 inch textured fiber cement substrate having a 5/16 inch thickness and approximately 12% moisture content. A sheet of precoat 68080 TEDLAR® film having a thickness of 0.0017 inches was then placed on the top surface of the fiber cement substrate. The stack comprised of the TEDLAR® film, adhesive, and fiber cement substrate was subsequently pressed at 300° F., 45 psi for 30 seconds to laminate the film to the substrate. Additionally, a padding material such as a sheet of rubber having a ⅛ inch thickness and 50 durometer hardness was placed on the top surface of the nonadhesive side of the TEDLAR® film during the lamination process.

The laminated substrates from Examples 1, 2, and 3 all showed strong adhesion between the TEDLAR® film and the fiber cement and no blisters were present between the TEDLAR® film and the fiber cement substrate. Adhesion is evaluated by testing the peel strength of the laminated panels in accordance with ASTM D903. The peel strength is greater than or equal to 17 lb/in. for panels from Examples 1, 2 and 3, and all failures involved cohesive ripping of the TEDLAR® film.

Furthermore, the adhesion between TEDLAR® and fiber cement did not deteriorate even after being subject to various boiling, freeze-thaw, wet-dry, and boiling-dry cycling tests. In particular, in the boiling test, three samples were placed in boiling water for one thousand hours and then subject to adhesion testing. In the freeze-thaw test cycle, three samples were fully immersed in water within a container while the container was frozen at a temperature of −20° C. for at least 1 hour and then thawed to about 20° C. for at least 1 hour. This freeze-thaw cycle was repeated for 15 times before the samples were tested for adhesion. In the wet-dry test cycle, three samples were soaked in water for 24 hours and dried at 60° C. for 24 hours. This wet-dry cycle was then repeated 50 times before adhesion was tested. In the boiling-dry cycling test, four test specimens were submerged in boiling water for 2 hours and dried in an over at 140° F. for 22 hours. This boiling-dry cycle was repeated for five times before subjecting the specimens to adhesion testing.

Advantageously, the adhesive systems of the preferred embodiments provide excellent adhesion durability between the fluorohydrocarbon film and fiber cement substrate. Furthermore, the adhesives demonstrate a fast working time and set time so as to permit the fluorohydrocarbon film to be quickly bonded to the fiber cement substrate, which in turn increases throughput in the manufacturing process. Furthermore, the adhesives effectively transmit detailed surface texture definition on the fiber cement substrate through to the fluorohydrocarbon film by creating a bond between the TEDLAR® film and the fiber cement substrate that is strong enough to permit the film to be stretched tightly before positioning it onto the substrate. As a result, the detailed texture definition on the surface of the fiber cement substrate is transmitted through to the TEDLAR® film.

Furthermore, unlike conventional adhesives used to bond fluorohydrocarbon films, the adhesives of the preferred embodiments do not contain measurable amounts of volatile organic chemicals (VOCs). As such, health and safety related issues surrounding the use of the adhesives are substantially reduced. Furthermore, the adhesives provide a cost-effective way of bonding the fluorohydrocarbon film to a fiber cement substrate as the constituent components and method of making the adhesive mixtures are relatively inexpensive.

Although the above examples illustrate using the adhesive compositions to bond TEDLAR® films to fiber cement substrates in the context of fabricating building material assemblies of the preferred embodiments, it can be appreciated that the adhesive system may be adapted to bond fluorohydrocarbon films to other substrates including but not limited to wood, metals such as aluminum, concrete and other cementitious materials, plastics such as polyvinyl chloride, composite materials such as fiber reinforced plastic, engineered wood materials such as hardboard or oriented strand board and gypsum board.

Figure 2:
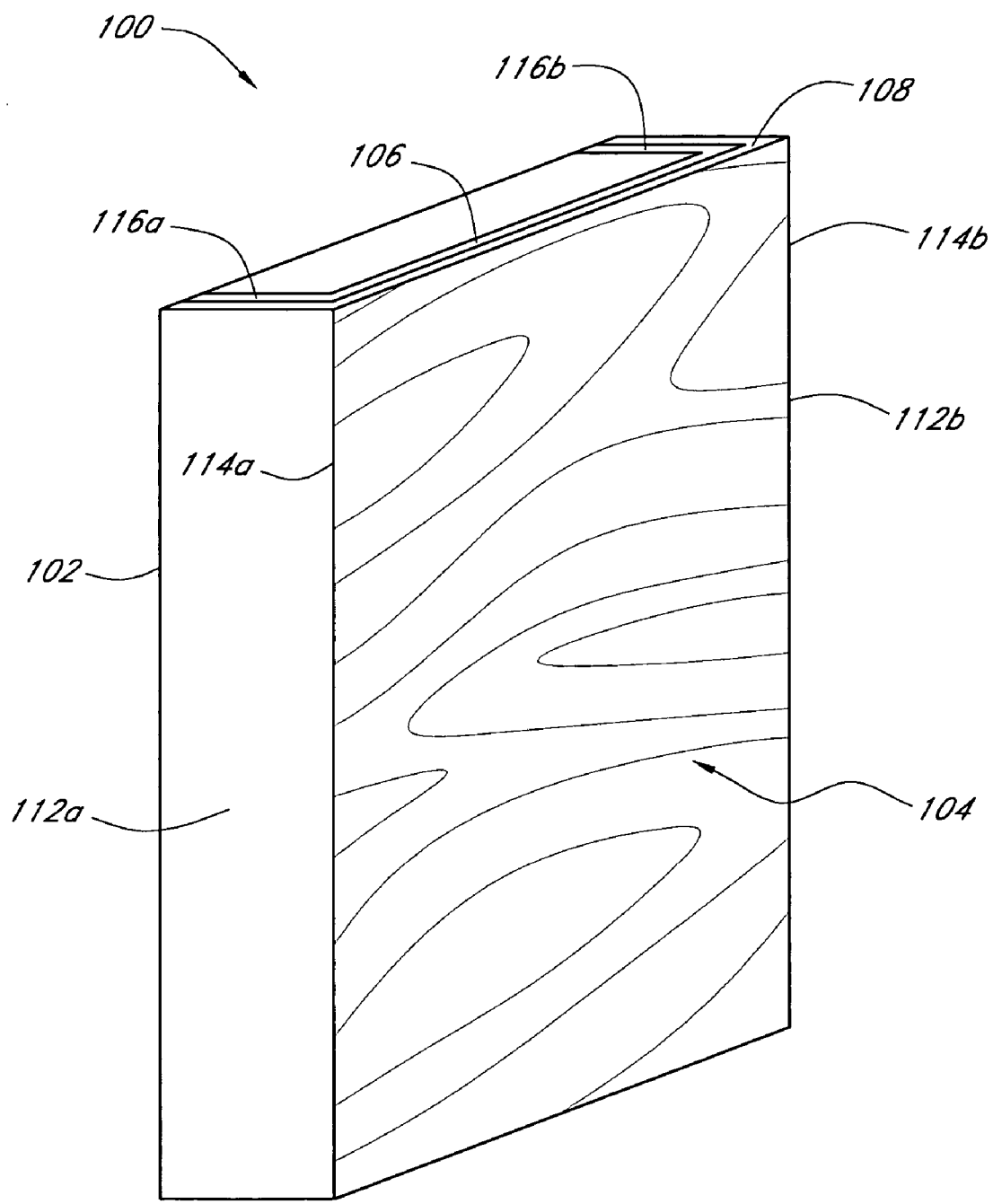
FIG. 2 is a perspective view of a building material assembly of another preferred embodiment.

FIG. 2 illustrates another embodiment of the building material assembly 100 in which the protective film 108 covers not only the entire exterior surface 104 of the substrate 102 but also opposing side surfaces 112a, 112b that extend perpendicularly from lateral edges 114a, 114b of the exterior surface 104. In particular, the film 108 is wrapped around the lateral edges 114a, 114b and extended down each side surface 112a, 112b. As FIG. 2 shows, a second layer of adhesive 116a, 116b is used to bond the film 108 to the side surfaces 112a, 112b. The second layer of adhesive 116a, 116b may be the same adhesive as that used to bond the film to the exterior surface, or alternatively a hot melt polyurethane adhesive or other adhesives commonly known in the art. Advantageously, the film 108 protects the side surfaces 112a, 112b from the effects of moisture and provides the assembly 100 with a more uniform appearance.

Figure 3:
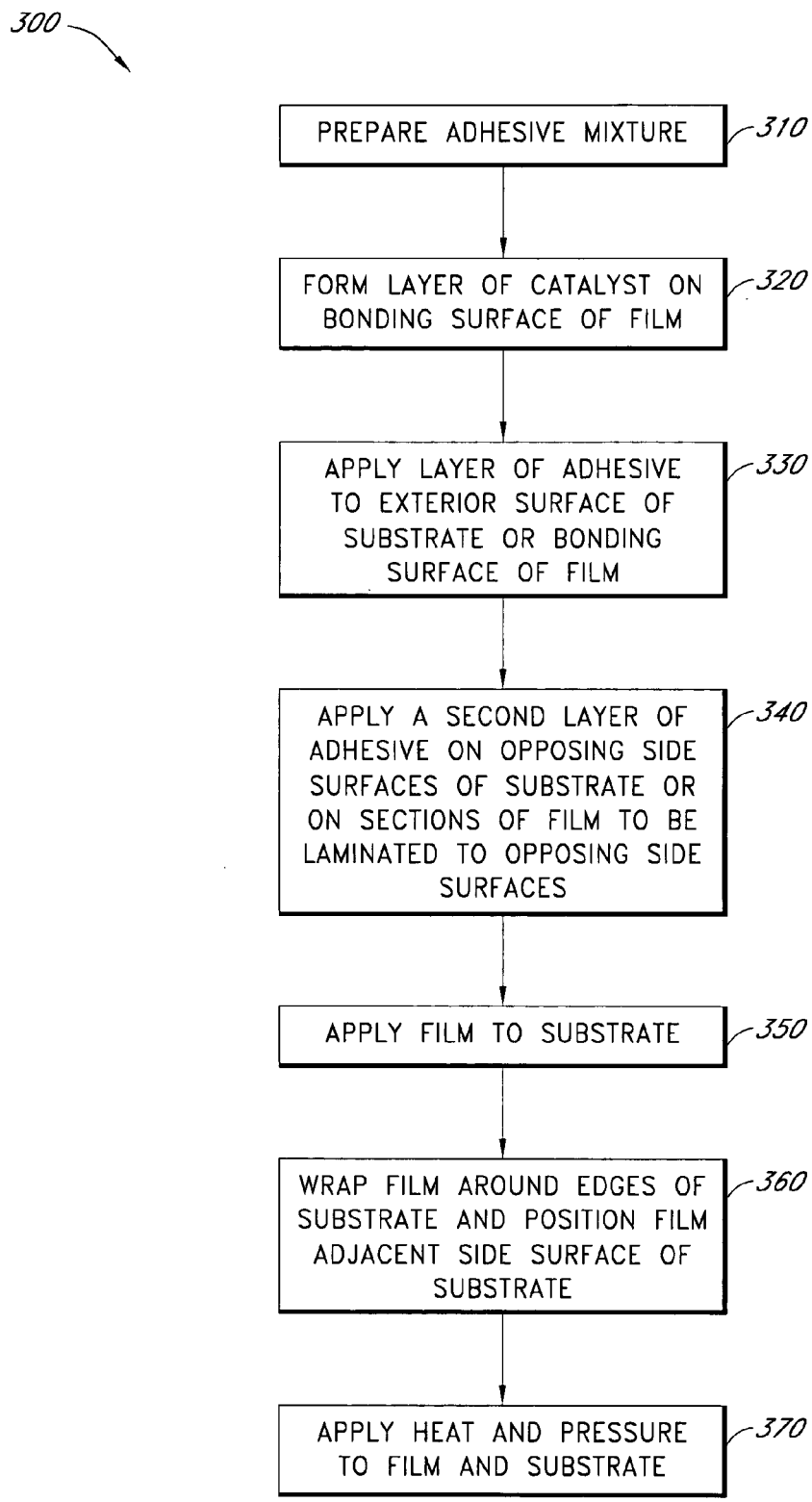
FIG. 3 illustrates a preferred process of manufacturing the preferred building material assemblies of FIGS. 1 and 2.

FIG. 3 illustrates a preferred process 300 of bonding the protective film 108 to the substrate 102 of the building material assembly 100. The process 300 begins with step 310 in which an adhesive mixture is prepared. Preferably, the adhesive mixture comprises a polyurethane based adhesive composition that is prepared in accordance with the methods described herein above.

As FIG. 3 further shows, subsequent to step 310, the process 300 may also include an optional step 320 in which a layer of catalyst is formed on the bonding surface of the protective film. Preferably, a thin layer of catalyst with accurately controlled thickness is formed on the bonding surface of the film. The thickness of the catalyst is preferably between about 0.00003 to 0.0005 inch, and more preferably between about 0.00005 to 0.0002 inch. In one embodiment, the layer of catalyst is comprised of Bicat 8 catalyst and applied to the film using a roller coater manufactured by Dubois Equipment Company, Inc. Advantageously, the catalyst formed in Step 320 promotes adhesion between the protective film and the substrate surface.

As shown in FIG. 3, the process 300 also includes a step 330 in which the adhesive mixture prepared in step 310 is applied to the exterior surface of the substrate or the bonding surface of the protective film. In one embodiment, the substrate is a fiber cement siding plank and the protective film is TEDLAR®. Preferably, the adhesive mixture is applied using an automatic adhesive sprayer manufactured by Graco, Inc. or Kremlin. Preferably, the layer of adhesive mixture formed is approximately between 0.001 to 0.005 inch thick, more preferably between about 0.001 and 0.003 inch. As previously described, step 330 can be performed directly following preparation of the adhesive mixture in step 310 or after formation of the catalyst layer in step 320.

Subsequent to the formation of the adhesive layer in step 330, one preferred process 300 comprises an optional step 340 in which a second layer of adhesive is formed on the opposing side surfaces of the substrate so as to bond the protective cover to the peripheral edges of the substrate. Alternatively, the second layer of adhesive can also be applied to sections of the film that will be placed adjacent the side surfaces of the substrate. The second layer of adhesive used for bonding the film to the side surfaces may be the same adhesive as that used to bond the film to the exterior surface, however other types of adhesives may also be used, such as hot melt polyurethane adhesives from Jowat, Atofindley, H. B. Fuller, Reichhold Chemicals, and Henkel. The thickness of the hot melt adhesive is preferably between about 0.002 inch and 0.020 inch, more preferably between about 0.002 inch and 0.01 inch. Advantageously, the film laminated to the side surfaces of the substrate will protect the peripheral edges of the substrate from the effects of moisture, ultraviolet radiation and the like. Furthermore, extending the film coverage to the side surfaces will also improve the aesthetic quality of the building material assembly as the entire assembly will have a uniform appearance.

As FIG. 3 further illustrates, the process 300 also includes a step 350 in which the protective film is applied to the exterior surface of the substrate. The film is preferably applied within three minutes of forming the layer of adhesive onto either the exterior surface of the fiber cement substrate or the bonding surface of the protective film as described in step 330. Preferably, the film is placed on the exterior surface of the substrate in a manner such that the film substantially covers the entire surface of the substrate. Subsequent to the application of the film to the substrate surface, the process 300 continues with an optional step 360 in which the film is wrapped around the edges of the substrate and positioned adjacent the side surfaces of the fiber cement plank using a wrapper, such as those manufactured by Barberan Equipment Company.

As FIG. 3 further shows, after the film is positioned over the substrate, the process 300 continues with a step 370 in which the protective film is laminated to the substrate. The lamination process generally entails applying heat and pressure to the film and substrate so that the layer of adhesive mixture therebetween is compressed and cured, thereby bonding the film to the substrate. The lamination process can be performed using vacuum press, membrane press, membrane plus vacuum press, platen press, continuous isobaric press, or any other lamination equipment known in the art. Furthermore, a rubber sheet is preferably placed on an outer, non-bonding surface of the film during lamination to facilitate transfer of the textured or embossed pattern on the substrate to the overlying film so that the exterior surface of the finished product retains the desired textured or embossed pattern.

In one embodiment, a conventional vacuum press is used to laminate the film to the substrate. Preferably, the film is pressed to the substrate at about 1 to 15 psi for about 2 to 5 minutes, more preferably at about 10 to 15 psi for about 3 to 5 minutes. The temperature of the lamination process is preferably between about 250 degrees F. and 500 degrees F., more preferably between about 300 degrees F. and 400 degrees F. In this particularly embodiment, no silicone-based rubber layer is placed on the outer surface of the film and the heat source is not in contact with the film. Furthermore, the adhesive cures at a slightly slower rate when compared with results from other lamination processes described below.

In another embodiment, a membrane press or membrane plus vacuum press is used to laminate the film to the substrate. As it is generally known in the art, a membrane (plus vacuum) press operates by applying heat and pressure to a membrane and causing the membrane to press down onto the film, causing the film to conform to the surface contours of the substrate. In one embodiment, a plurality of fiber cement planks are positioned adjacent each other on a lower platen of the membrane press while a layer of film is positioned on the exterior surface of each plank. Preferably, during lamination, the membrane exerts pressure on the film and pushes the film into the space between adjacent planks causing the film to wrap around the lateral edges of the planks and contact each side surface. Generally, the minimum distance is dependent on the thickness of the planks with the thicker planks requiring a wider distance between planks. For instance, fiber cement planks having a thickness of 5/16 inch typically require a 2 inch gap between adjacent planks to ensure that the side surfaces of the planks are laminated with film.

Preferably, the film is pressed to the substrate at about 15 to 90 psi for about 5 seconds to 5 minutes, more preferably at about 15 to 50 psi for about 5 seconds to 30 seconds. The temperature of the lamination process is preferably between about 250 degrees F. and 500 degrees F., more preferably between about 300 degrees F. and 400 degrees F. Furthermore, a silicone-based rubber layer is placed between the membrane and the outer surface of the film to enable the transfer of the textured or embossing pattern on the substrate surface to the overlying film so that the finished product has the same texture or embossing as the substrate surface. Preferably, the silicone-based rubber layer has a durometer between about 10 and 100 shore A, and a thickness between about 1/16 inch and 1/4 inch.

Advantageously, the membrane plus vacuum press is capable of removing air between the film and substrate and also removing moisture vapor generated from the substrate during the press. As such, the membrane plus vacuum press process substantially reduces occurrence of blisters in the laminate. Furthermore, the membrane presses are capable of laminating the film to the exterior and side surfaces of the substrate at the same time, which eliminates the need of using a separate wrapper to laminate the film to the side surfaces. However, as described above, in order for the side surfaces to be laminated at the same time as the exterior surface of the substrate, the membrane press set up requires a minimum distance between the substrates, depending on the thickness of the substrate. The required spacing between the substrates could take up valuable press space and thus reduce the efficiency of the lamination process. Furthermore, the cycle time of the membrane vacuum press could also be longer than that of the platen presses as it involves pushing pressured air in and getting pressured air out.

Figure 4:
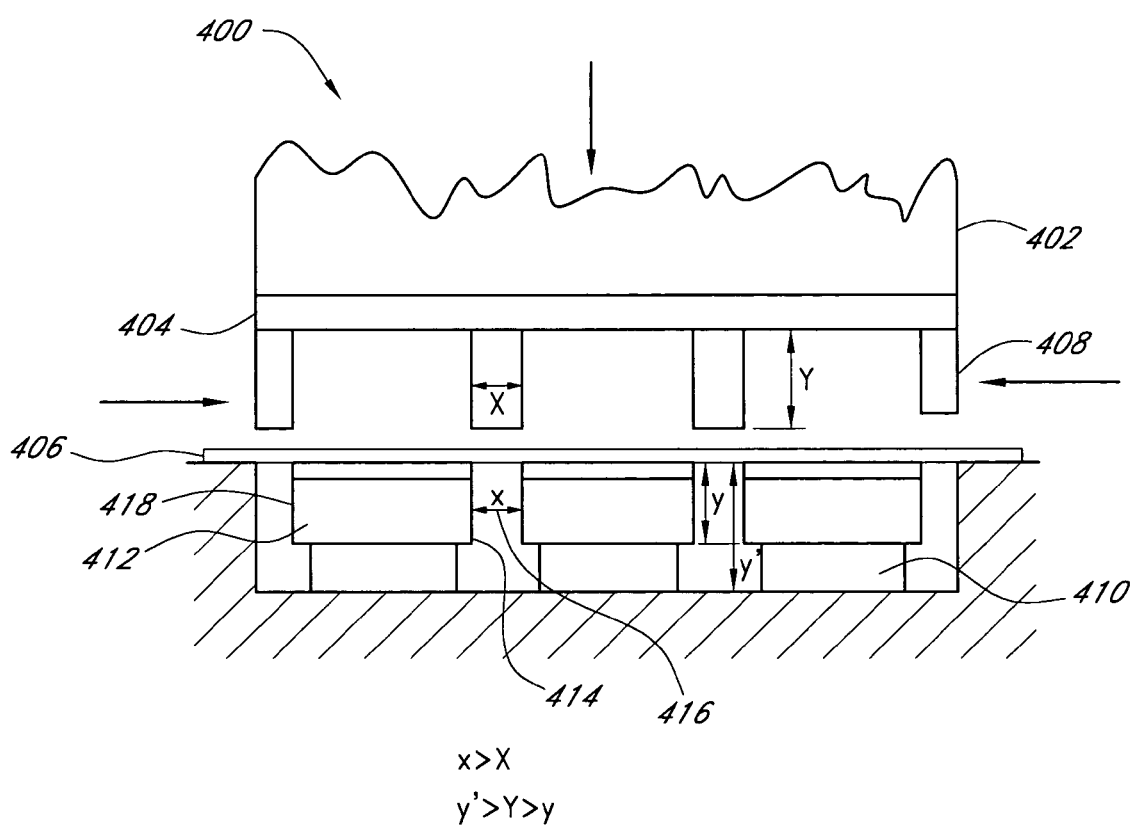
FIG. 4 is a schematic illustration of a press setup for laminating the building material assembly of FIG. 2.

In yet another embodiment, a continuous isobaric press is used to laminate the film to the substrate. The continuous isobaric press is also capable of simultaneously laminating the exterior and side surfaces of the substrate, yet can do so much more efficiently than the membrane press or membrane vacuum press. FIG. 4 illustrates a preferred press setup 400 for the continuous isobaric press in which the setup is adapted for laminating a protective film to a fiber cement substrate.

As shown in FIG. 4, the press setup 400 generally includes a horizontal press platen 402 that is made of a thick piece of metal or a metal belt and has a heat source that is capable of raising the platen temperature to about 500 degrees F. The press setup 400 further includes a rubber sheet 404 that is made of a layer of silicone-based rubber and has a durometer between about 10 and 100 shore A and a thickness between about 1/16 inch and 1/4 inch. In one embodiment, the rubber sheet 404 is placed between the press platen 402 and the non-bonding surface of a layer of film that is to be laminated to the substrate. In another embodiment, the rubber sheet 404 is wrapped on the press platen 402 and heated up to about 200 degrees F. to 450 degrees F. as shown in FIG. 4. The rubber sheet 404 is designed to optimized the transfer of the texture on the substrate to the final exterior finish.

Furthermore, as it is shown in FIG. 4, the press setup 400 also includes a plurality of vertical members 408, preferably comprising rubber belts, that are dimensioned to fit in the gaps between adjacent substrates in the press. The vertical members 408 cause the film to wrap around the lateral edges of the substrate and be pushed into the gaps between the substrates while applying heat and pressure to the side surfaces of the substrates so as to bond the film to the side surfaces. In one embodiment, the thickness of the rubber belt 408 in a horizontal direction is between about ¼ inch and 1 inch while the thickness of the rubber belt 408 in a vertical direction is thicker than the thickness of laminate so that the rubber belt 408 can generate lateral pressure under press compression loads against the side surfaces of the laminate to establish a good edge bond. Preferably, each rubber belt 408 has a durometer between about 10 and 100 shore A, a thickness in a horizontal direction of about ¹⁄₁₆ inch to 1 inch, more preferably ¹⁄₁₆ inch to ¼ inch, and is heated up to about 200 degrees F. to 450 degrees F. in the press.

FIG. 4 further shows that the press setup 400 also includes a plurality of support material 410 that may be made of metals such as aluminum, steel or any material that can remain stable at temperature of about 450 degree F. As FIG. 3 further illustrates, each support material 410 is adapted to hold up a fiber cement plank 412. In one embodiment, the width of the support material 410 is preferably narrower than the fiber cement plank 412 so that the rubber belt 408 can reach a bottom edge 414 of the plank 412 and ensure that the bottom edge 414 is also laminated.

During lamination, the film is pressed to the exterior surface of the plank at about 15 to 700 psi for about 5 seconds to 5 minutes, more preferably at about 100 to 600 psi for about 5 seconds to 30 seconds. The temperature of the lamination process is preferably between about 250 degrees F. and 500 degrees F., more preferably between about 350 degrees F. and 450 degrees F. Advantageously, during lamination, the rubber belts 408 physically pushes the film into the space 416 between adjacent planks and applies heat and lateral pressure to the side surface of the substrates so as to form a durable bond between the film 406 and the side surfaces 418 of the substrate 412. Furthermore, in a continuous isobaric press as shown in FIG. 4, the substrates can be moved in and out of the press set-up using a conveyor type system so as to further reduce the cycle time of the lamination process.

The following examples are illustrative embodiments of the lamination process used to form the building material assembly. However, it can be appreciated that these examples are for illustrative purposes only and are not intended to limit the scope of the invention.

EXAMPLE 4

A preferred lamination process utilizes a vacuum press to laminate a film to a fiber cement plank having Cedarmill woodgrain texture on the surface. Preferably, the film is a 68080 precoated TEDLAR® film having a thickness of 1.7 mils. Preferably, the adhesive used to laminate the film to the fiber cement plank is a fast cure two component polyurethane adhesive as described herein above. In particular, approximately 6.6 grams of the adhesive mixture was applied by brush on a 8.25×24 inch textured fiber cement panel having a ⁵⁄₁₆ inch thickness and a moisture content of about 12% by weight. The laminate comprising of the film, adhesive, and fiber cement plank was then placed in a Mercury vacuum press with temperature set at 325 degrees F. Once the process temperature reached 320 degrees F., a vacuum of approximately 1 bar was pulled for about 5 minutes.

EXAMPLE 5

Another preferred lamination process utilizes a membrane plus vacuum press to laminate a film to a fiber cement plank having Cedarmill woodgrain texture on the surface. Preferably, the film is a 68080 precoated TEDLAR® film having a thickness of 1.7 mils and coated with 0.2 g of Bicat 8 catalyst. Preferably, the adhesive mixture is a fast cure two component polyurethane adhesive comprising 100 g of an aromatic polymeric isocyanate material such as Rubinate M and 100 g of Voranol 230-238 mixed with 0.2 g of Bicat 8 catalyst. Approximately 22.7 g of the adhesive mixture was applied by brush to the exterior surface of a 8.25 inch×48 inch textured fiber cement panel having a ⁵⁄₁₆ inch thickness and a moisture content of about 1% by weight. The film coated with the catalyst was placed on the exterior surface of the fiber cement plank having the adhesive applied thereon. Moreover, a rubber sheet having a thickness of ⅛ inch and a hardness of 50 durometer was placed on an outer surface of the TEDLAR® film while the film, adhesive, and fiber cement plank were laminated in a Globe membrane plus vacuum press at 300 degrees F. and 45 psi for 5 seconds.

EXAMPLE 6

Another preferred lamination process utilizes a platen press to laminate a film to a fiber cement plank having Cedarmill woodgrain texture on the surface. Preferably, the film is a 68080 precoated TEDLAR® film having a thickness of 1.7 mils and coated with 0.0001 mil of Bicat 8 catalyst. Preferably, the adhesive mixture is a fast cure two component polyurethane adhesive comprising 100 g of an aromatic polymeric isocyanate material such as Rubinate M and 100 g of Voranol 230-238 mixed with 0.2 g of Bicat 8 catalyst. Approximately 0.4 g of the adhesive mixture was applied by brush to the exterior surface of a 2 inch×6 inch textured fiber cement panel having a ⁵⁄₁₆ inch thickness and a moisture content of about 12% by weight. The film coated with the catalyst was placed on the exterior surface of the fiber cement plank having the adhesive applied thereon. Moreover, a rubber sheet having a thickness of ¹⁄₁₆ inch and a hardness of 30 durometer was placed on an outer, non-bonding surface of the TEDLAR® film while the film, adhesive, and fiber cement plank were laminated together at 350 degrees F. and 90 psi for 30 seconds.

EXAMPLE 7

Another preferred method utilizes a wrapper to laminate the film to the edges of a substrate. Preferably, the film is a 68070 precoated TEDLAR® film having a thickness of 2.5 mils and coated with 10 mils of a hot melt moisture cure polyurethane adhesive such as AtoFindley H0111. The film coated with the hot melt adhesive was wrapped on the fiber cement plank using a Barberan wrapper. Moreover, a rubber sheet having a thickness of ⅛ inch and a hardness of 50 durometer was then placed on an outer surface of the TEDLAR® film while the film, adhesive, and fiber cement plank were laminated in a Globe platen press at 400 degrees F. and 125 psi for 10 seconds.

EXAMPLE 8

Another preferred method utilizes a membrane press to laminate the film to the edges of a fiber cement plank while at the same time pressing the film to the exterior surface of the plank. Preferably, the film is a 68080 precoated TEDLAR® film having a thickness of 1.7 mils and coated with 0.0001 mil of Bicat 8 catalyst. Preferably, the adhesive mixture is a fast cure two component polyurethane adhesive comprising 100 g of an aromatic polymeric isocyanate material such as Rubinate M and 100 g of Voranol 230-238 mixed with 0.2 g of Bicat 8 catalyst. Approximately 10.5 g of the adhesive mixture was applied by brush to the exterior surface and edges of a 8.25 inch×24 inch textured fiber cement panel having a 5/16 inch thickness and a moisture content of about 6% by weight.

The film coated with the catalyst was placed on the exterior surface of the fiber cement plank having the adhesive applied thereon. Moreover, a rubber sheet having a thickness of 1/8 inch and a hardness of 50 durometer was placed on an outer surface of the TEDLAR® film while the film, adhesive, and fiber cement plank were laminated together in a Mercury membrane press at 350 degrees F. and 90 psi for 120 seconds. Advantageously, the membrane press or membrane plus vacuum press is able to laminate the film to the surfaces and edges of the plank at the same time, which precludes the additional step of using a wrapper to laminate the edges.

EXAMPLE 9

Another preferred method utilizes a platen press to laminate the film to the edges of a plurality of fiber cement planks. Preferably, the film is a 68080 precoated TEDLAR® film having a thickness of 1.7 mils and coated with 0.0001 mil of Bicat 8 catalyst. Preferably, the adhesive mixture is a fast cure two component polyurethane adhesive comprising 100 g of an aromatic polymeric isocyanate material such as Rubinate M and 100 g of Voranol 230-238 mixed with 0.2 g of Bicat 8 catalyst. Approximately 0.6 g of the adhesive mixture was applied by brush to the exterior surface and edges of two 2 inch×6 inch textured fiber cement panels having a 5/16 inch thickness and a moisture content of about 6% by weight.

Approximately a 6 inch×8 inch piece of the TEDLAR® film was placed on the exterior surface of each fiber cement plank having the adhesive applied thereon. Moreover, a rubber sheet having a thickness of 1/8 inch and a hardness of 50 durometer and three pieces of rubber strips having dimensions of 1/4×1/2×6 inch were placed on an outer surface of the TEDLAR® film. Specifically, one rubber strip was placed between adjacent planks and the other two rubber strips were placed on the sides of the planks that were not adjacent each other. The film, adhesive, and fiber cement planks were then pressed in a platen press at 350 degrees F. and 90 psi for 120 seconds. During the lamination process, the rubber strips were preheated to 350 degrees F. and a plurality of screws were used to apply horizontal pressure on the rubber strips so that the rubber strips in turn pressed the film against the edges of the fiber cement plank.

The finished fiber cement assemblies from Examples 4–9 all showed strong adhesion between the TEDLAR® film and the fiber cement plank and no blisters were present between the TEDLAR® film and the fiber cement substrate. Adhesion is evaluated, by testing the peel strength of the laminated panels in accordance with ASTM D903. The peel strength is greater than or equal to 17 lb/in. for panels from Examples 4–9, and all failures involved cohesive ripping of the TEDLAR® film.

Furthermore, the adhesion between TEDLAR® and fiber cement did not deteriorate even after being subject to various boiling, freeze-thaw, wet-dry, and boiling-dry cycling tests. In the boiling test, three samples were placed in boiling water for one thousand hours and then subject to adhesion testing. In the freeze-thaw test cycle, three samples were fully immersed in water within a container while the container was frozen at a temperature of −20° C. for at least 1 hour and then thawed to about 20° C. for at least 1 hour. This freeze-thaw cycle was repeated for 15 times before the samples were tested for adhesion. In the wet-dry test cycle, three samples were soaked in water for 24 hours and dried at 60° C. for 24 hours. This wet-dry cycle was then repeated 50 times before adhesion was tested. In the boiling-dry cycling test, four test specimens were submerged in boiling water for 2 hours and dried in an over at 140° F. for 22 hours. This boiling-dry cycle was repeated for five times before subjecting the specimens to adhesion testing.

Furthermore, the laminated fiber cement planks retained the same textured surface as the fiber cement substrate. Advantageously, the process of the preferred embodiments effectively transmits detailed surface texture definition on the fiber cement substrate through to the TEDLAR® film. As a result, the laminated fiber cement assembly maintains the surface texture of the underlying fiber cement substrate while providing an aesthetically pleasing and uniform pre-finish on the exterior surface. The pre-finished surface further precludes the need for painting the substrate, either at the building construction site or in the factory. Advantageously, the laminated fiber cement assembly can be delivered and installed pre-finished and does not require any additional painting by the user.

Moreover, preferred embodiments of the present invention form a building material assembly having the durable properties of both a fiber cement substrate and a fluorohydrocarbon film. The building material assembly formed comprises a pre-finished, durable, laminated structure that exhibits strong adhesion between the substrate and protective film. Furthermore, the building material assembly can be formed using a single adhesive and lamination process with a relatively short cycle time.

Advantageously, the fiber cement assembly of the preferred embodiments provide a building material with excellent exterior durability and weather resistance. In particular, the fiber cement assembly reduces water absorption rate of the fiber cement substrate and will not deteriorate in freeze-thaw cycling. Furthermore, the fluorohydrocarbon protective film used is superior to most conventional paint coatings in that the film provides much stronger mechanical properties and can resist natural weathering and polymer degradation. In most instances, the laminated fiber cement assembly may not need paint for up to 25 years or longer.

Although the foregoing description of the preferred embodiments of the present invention has shown, described and pointed out the fundamental novel features of the invention, it will be understood that various omissions, substitutions, and changes in the form of the detail of the invention as illustrated as well as the uses thereof, may be made by those skilled in the art, without departing from the spirit of the invention. Consequently, the scope of the invention should not be limited to the foregoing discussions, but should be defined by the appended claims.

What is claimed is:

1. A method of forming an assembly comprising a substrate, a first layer, a second layer and a fluorocarbon film, the method comprising:

forming the first layer on a first surface of the substrate wherein the first surface is an exterior-facing surface and has a texture, wherein the first layer is an adhesive mixture that includes a reactive isocyanate compound and a catalyst that catalyzes a reaction between the isocyanate compound and hydroxyl functional groups on the surface of the substrate and the substrate is a fiber reinforced cement material;

forming a second layer on a second surface of the substrate wherein the second surface extends substantially perpendicularly from lateral edges of the first surface of the substrate and the second layer is an adhesive mixture;

placing a fluorohydrocarbon film on the first surface of the substrate; and applying heat and pressure to the film in a manner such that the film is bonded to the first surface and second surface of the substrate at the same time, wherein the texture of the first surface is transferred through the film.

2. The method of claim 1 further comprises placing a rubber sheet on a non-bonding surface of the film wherein the rubber sheet facilitates transfer of the texture on the exterior surface of the substrate to the film.

3. The method of claim 2 wherein placing the rubber sheet on the non-bonding surface of the film comprises placing a rubber sheet having a durometer between about 10 and 100 shore A and a thickness between about 1/16 inch and 1/4 inch.

4. The method of claim 1 wherein applying heat and pressure to bond the film comprises using a press having a horizontal member that presses a first section of the film against the exterior surface of the substrate and a plurality of vertical members that cause a second section of the film to wrap around the lateral edges and press against the side surface of the substrate.

5. The method of claim 4 wherein using the press comprises using a continuous isobaric press.

6. The method of claim 5 wherein the horizontal member comprises a metal platen covered with rubber sheet and the vertical members comprise a plurality of rubber belts.

7. The method of claim 6 wherein the rubber belts have a durometer between about 10 and 100 shore A and a thickness in a horizontal direction of about 1/16 inch to 1 inch.

8. The method of claim 6 wherein the vertical members have a thickness greater than the thickness of the substrate plus the second layer of adhesive and the film.

9. The method of claim 5 wherein the continuous isobaric press further comprises a plurality of support materials having an upper surface that is adapted to receive a substrate, each support material having a width smaller than the width of the substrate.

10. The method of claim 1 wherein applying heat and pressure to the film comprises applying approximately 15 to 700 psi for about 5 seconds to 5 minutes at between about 350 degrees and 450 degrees F.

11. A method of forming an assembly comprising a substrate, a first layer, a second layer and a fluorocarbon film, the method comprising:

forming the first layer on a first surface of the substrate wherein the first surface is an exterior-facing surface and has a texture, wherein the first layer is an adhesive mixture and the substrate is a fiber reinforced cement material with hydroxyl functional groups on its surface;

forming a second layer on a second surface of the substrate wherein the second surface extends substantially perpendicularly from lateral edges of the first surface of the substrate and the second layer is an adhesive mixture that includes a reactive isocyanate compound and a catalyst catalyzes a reaction between the isocyanate compound and hydroxyl functional groups on the surface of the substrate;

placing a fluorohydrocarbon film on the first surface of the substrate, and wherein the substrate has hydroxyl functional groups on the first surface; and applying heat and pressure to the film in a manner such that the film is bonded to the first surface and second surface of the substrate at the same time, wherein the texture of the first surface is transferred through the film.

12. A method of forming an assembly comprising a substrate, a first layer, a second layer and a fluorocarbon film, the method comprising:

forming the first layer on a first surface of the substrate wherein the first surface is an exterior-facing surface and has a texture, wherein the first layer is an adhesive mixture and the substrate is a fiber reinforced cement material with hydroxyl groups on its surface;

forming a second layer on a second surface of the substrate wherein the second surface extends substantially perpendicularly from lateral edges of the first surface of the substrate and the second layer is a hot-melt polyurethane based adhesive that reacts with the hydroxyl groups;

placing a fluorohydrocarbon film on the first surface of the substrate; and applying heat and pressure to the film in a manner such that the film is bonded to the first surface and second surface of the substrate at the same time, wherein the texture of the first surface is transferred through the film.

* * * * *